United States Patent
Barney et al.

(10) Patent No.: US 9,560,019 B2
(45) Date of Patent: Jan. 31, 2017

(54) METHOD AND SYSTEM FOR MANAGING SECURITY IN A COMPUTING ENVIRONMENT

(71) Applicant: International Business Machines Corporation, Armonk, NY (US)

(72) Inventors: Jonathan M. Barney, Kingston, NY (US); Cataldo Mega, Tuebingen (DE); Edmond Plattier, Antibes (FR); Daniel Suski, Doblingen (DE)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 14/183,735

(22) Filed: Feb. 19, 2014

(65) Prior Publication Data

US 2014/0310513 A1    Oct. 16, 2014

(30) Foreign Application Priority Data

Apr. 10, 2013  (EP) .................................... 13305466

(51) Int. Cl.
*H04L 29/06* (2006.01)

(52) U.S. Cl.
CPC ......... *H04L 63/0428* (2013.01); *H04L 63/062* (2013.01); *H04L 63/0471* (2013.01); *H04L 63/0478* (2013.01)

(58) Field of Classification Search
CPC .. H04L 63/0428; H04L 63/04; H04L 63/0478; H04L 63/06; H04L 2463/041; H04L 63/062; H04L 63/0471; G06F 21/60; G06F 21/606; G06F 21/62; G06F 21/78

(Continued)

(56) References Cited

U.S. PATENT DOCUMENTS 5,602,918 A * 2/1997 Chen et al. ................... 713/153
6,381,331 B1 4/2002 Kato
(Continued)

FOREIGN PATENT DOCUMENTS

EP     2423813        2/2012
WO     2005065084 A2  7/2005
(Continued)

OTHER PUBLICATIONS

IBM Research Zurich Research Laboratory, Retrieved from the Internet: < URL: http://www.ibm.com/security/products/cryptotools.shtml>, Dec. 3, 2007, 21 pages.
(Continued)

*Primary Examiner* — Sarah Su
(74) *Attorney, Agent, or Firm* — Schmeiser, Olsen & Watts, LLP; John Pivnichny

(57) ABSTRACT

A method and system for managing data security in a computing environment. A processor at the gateway server receives, from a user device, at least one message. Each message requests that an encryption key be downloaded to the user device. The gateway server interfaces between the user device and a cloud that includes interconnected computing systems external to the user device. In response to the received at least one message, the processor generates at least one unique encryption key for each message and sends the at least one generated encryption key to the user device, but does not store any of the generated encryption keys in the cloud. For each encryption key having been sent to the user device, the processor receives each encryption key returned from the user device. For each encryption key received from the user device, the processor stores each received encryption key in the cloud.

15 Claims, 12 Drawing Sheets

(58) Field of Classification Search
USPC .................................. 713/153, 150; 380/283
See application file for complete search history.

(56) References Cited

U.S. PATENT DOCUMENTS

| | | | |
|---|---|---|---|
| 6,577,734 | B1 | 6/2003 | Etzel et al. |
| 7,277,941 | B2 | 10/2007 | Ignatius et al. |
| 7,739,381 | B2 | 6/2010 | Ignatius et al. |
| 8,285,681 | B2 | 10/2012 | Prahlad et al. |
| 8,407,190 | B2 | 3/2013 | Prahlad et al. |
| 8,429,428 | B2 | 4/2013 | Ignatius et al. |
| 8,468,244 | B2 | 6/2013 | Redlich et al. |
| 8,855,317 | B2 * | 10/2014 | Rong et al. ............. 380/278 |
| 2005/0257062 | A1 | 11/2005 | Ignatius et al. |
| 2008/0037777 | A1 | 2/2008 | Ignatius et al. |
| 2009/0254572 | A1 | 10/2009 | Redlich et al. |
| 2010/0069035 | A1 | 3/2010 | Johnson |
| 2010/0250497 | A1 | 9/2010 | Redlich et al. |
| 2010/0313039 | A1 | 12/2010 | Ignatius et al. |
| 2010/0332401 | A1 | 12/2010 | Prahlad et al. |
| 2010/0332454 | A1 | 12/2010 | Prahlad et al. |
| 2010/0332456 | A1 | 12/2010 | Prahlad et al. |
| 2010/0332479 | A1 | 12/2010 | Prahlad et al. |
| 2010/0332818 | A1 | 12/2010 | Prahlad et al. |
| 2010/0333116 | A1 | 12/2010 | Prahlad et al. |
| 2011/0055559 | A1 | 3/2011 | Li et al. |
| 2011/0119481 | A1 | 5/2011 | Auradkar et al. |
| 2011/0200045 | A1 * | 8/2011 | Baehre ............ H04L 12/4633 370/392 |
| 2011/0238935 | A1 | 9/2011 | Meehan |
| 2012/0054624 | A1 | 3/2012 | Owens, Jr. et al. |
| 2012/0072728 | A1 | 3/2012 | Teather et al. |
| 2012/0072985 | A1 | 3/2012 | Davne et al. |
| 2012/0134495 | A1 * | 5/2012 | Liu ............................. 380/46 |
| 2012/0159165 | A1 * | 6/2012 | Schibuk .................... 713/168 |
| 2012/0166576 | A1 | 6/2012 | Orsini et al. |
| 2012/0317655 | A1 * | 12/2012 | Zhang et al. ............... 726/28 |
| 2013/0024424 | A1 | 1/2013 | Prahlad et al. |
| 2013/0042106 | A1 * | 2/2013 | Persaud et al. ........... 713/165 |
| 2013/0064365 | A1 * | 3/2013 | Song ............................ 380/44 |
| 2013/0219169 | A1 * | 8/2013 | Del Signore et al. ...... 713/153 |
| 2013/0227352 | A1 | 8/2013 | Kumarasamy et al. |
| 2013/0238562 | A1 | 9/2013 | Kumarasamy et al. |
| 2013/0238563 | A1 | 9/2013 | Amarendran et al. |
| 2013/0238572 | A1 | 9/2013 | Prahlad et al. |
| 2013/0238575 | A1 | 9/2013 | Amarendran et al. |
| 2013/0246922 | A1 | 9/2013 | Doerr et al. |
| 2013/0253977 | A1 | 9/2013 | Vibhor et al. |
| 2013/0254402 | A1 | 9/2013 | Vibhor et al. |
| 2013/0254699 | A1 * | 9/2013 | Bashir et al. ............... 715/772 |
| 2013/0262385 | A1 | 10/2013 | Kumarasamy et al. |
| 2013/0262392 | A1 | 10/2013 | Vibhor et al. |
| 2013/0262394 | A1 | 10/2013 | Kumarasamy et al. |
| 2013/0262396 | A1 | 10/2013 | Kripalani et al. |
| 2013/0262615 | A1 | 10/2013 | Ankireddypalle et al. |
| 2013/0263289 | A1 | 10/2013 | Vijayan et al. |
| 2013/0268752 | A1 * | 10/2013 | Morecki et al. ............ 713/155 |
| 2013/0275752 | A1 * | 10/2013 | Zhang et al. .............. 713/167 |
| 2014/0089674 | A1 * | 3/2014 | Buehl ......................... 713/189 |
| 2014/0208434 | A1 * | 7/2014 | Brouwer et al. ............ 726/26 |

FOREIGN PATENT DOCUMENTS

| | | |
|---|---|---|
| WO | 2005065084 A3 | 7/2005 |
| WO | 2011002777 | 1/2011 |
| WO | 2013134408 | 9/2013 |
| WO | 2013148096 | 10/2013 |

OTHER PUBLICATIONS

Kamara et al., Cryptographic Cloud Storage, Jan. 10, Workshop on Real-Life Cryptographic Protocols and Standardization, 14 pages.

Wang et al., Toward Secure and Dependable Storage Services in Cloud Computing, IEEE Transactions on Services Computing, vol. 5, No. 2, Apr.-Jun. 2012, pp. 220-232.

FIPS 140, From Wikipedia, Retrieved from the Internet: < URL: http://en.wikipedia.org/wiki/FIPS_140>, 3 pages.

Contents, Oct. 13, 2013, Retrieved from the Internet: < URL: http://pic.dhe.ibm.com/infocenter/p8docs/v5r1m0/advanced/tocViews.jsp?. . . >, 1 page.

Processor Editorial Article—Safeguard Your Encryption Keys, Tech & Trends, Oct. 26, 2007, vol. 29, Issue 43, Retrieved from the Internet: < URL: http://www.processor.com/editorial/article.asp?article=articles/P2943/33 . . . >, 3 pages.

How to manage encryption keys, Retrieved from the Internet: < URL: http://searchdatabackup.techtarget.com/report/How-to-manage-encryptio . . . >, [retrieved on Oct. 13, 2013], pp. 4-12.

How to Patent Your Idea, FPO IP Research & Communities, 3 Easy Steps to Patent & Make Money Get A free Patent & Invention Kit, Retrieved from the Internet: < URL: http://freepatentsonline.com/result.html?query_txt=encryption,+se . . . >, [retrieved on Oct. 23, 2013], 3 pages.

IBM SmartCloud Resilience (content management) IBM SmartCloud C, Product ID: 6948-16Q, Retrieved from the Internet: < URL: http://www-01.ibm.com/common/ssi/ShowDoc.wss?docURL=/common/s . . . >, [Retrieved on Oct. 13, 2013], 2 pages.

* cited by examiner

FIG. 9

| Active key | Contents | Storage time | Validation time |
|---|---|---|---|
| Key-1 | Ekey-1(Files XXX) | March 21, 2012 | January 1st 2012 |
| Key-2 | Ekey-2(Files XXY) | January 15, 2013 | January 1st 2013 |

| Retired key | Active key | Contents | Storage time | Validation time |
|---|---|---|---|---|
| | Key-1 | Ekey-1(Files XXX) | March 21, 2012 | January 1st 2012 |

FIG. 10

| Retired key | Active key | Contents | Storage time | Validation time |
|---|---|---|---|---|
| Key-1 | | Ekey-2(Files XXX) | March 21, 2012 | January 1st 2012 |
| | Key-2 | Ekey-2(Files XXY) | January 15, 2013 | January 1st 2013 |

| Active key | Contents | Storage time | Validation time |
|---|---|---|---|
| Key-1 | Ekey-1(Files XXX) | March 21, 2012 | January 1st 2012 |
| Key-2 | Ekey-2[Ekey-1(Files XXX)] | March 21, 2012 | January 1st 2013 |

1211, 1212, 1213, 1214, 1221, 1222, 1223, 1224

METHOD AND SYSTEM FOR MANAGING SECURITY IN A COMPUTING ENVIRONMENT

TECHNICAL FIELD

The present invention relates to methods and systems for managing cryptographic keys, including selecting the computing entity to be used to generate a key for use in encrypting and securely storing data.

BACKGROUND

Cloud computing solutions have been developed for cost-effective distributed storage, distributed processing and for delivery of other services. Storing to "the cloud" involves making use of available storage that can be located wherever there is spare capacity in a network, with the entity that wishes to use the storage service not needing to choose the physical storage locations. Services provided by a cloud services provider typically include helping the customer (e.g., a company) to manage and store their data reliably and securely using network communications including Internet technologies and distributed computing and storage. For example, customers may rely on the cloud services to back up regularly and to possibly recover data lost from laptops, workstations, email servers etc. In the field of managed storage services in cloud computing, the cloud service provider stores the data on a shared managed storage cloud. The customer whose data is to be stored in the cloud can be an individual client using a personal device or an organization having an internal data processing network.

An example cloud storage service offering is the SmartCloud Content Management (SCCM) service provided by IBM® Corporation. It provides customers with private storage within a shared managed cloud, and offers content management, archiving and information lifecycle management. An early IBM offering on which the SCCM is based is the IBM® "SmartCloud Archive", which is a software-implemented managed storage service offering, mainly for enterprise customers, and which is implemented on an IBM Data center server. It may be hosted by BCRS (Business Continuity and Recovery Service) in IBM data centers and delivered on IBM Cloud technology to facilitate overall archiving and retrieval of data. It is usable by customers who need to carry out a number of operations including: indexing, searching, retrieving, and tracking client specific content in a digital form; e.g., Statements, confirmations, external customer correspondence, and business documents (PDF, Word, Excel, etc.), scanning and checking images. The SmartCloud solutions integrate various technical features and benefits of previous solutions such as features provided by IBM's AIX® servers, IBM's Storwize v7000 storage management solutions, the IBM FileNet P8 platform, IBM's Tivoli Storage Manager (TSM) archiving, and LTO (Linear Tape-Open) technologies.

In some known solutions, cloud service customers are provided with a portal to manage their cloud storage environment. The portal provides one or more of functions: a customer administrator is given access for defining an archive structure and access rights. In addition, a customer user access is defined for loading and/or retrieving data such as files and documents. Moreover, customers are provided with functions for searching and storing documents according to various criteria. The customer is often able to control its cloud environment by means of a user interface. This user interface can allow the client to manage the cloud environment from virtually anywhere in the world.

Cloud-based solutions when deployed inherently raise some security concerns. Security concerns are partly linked to a multi-tenancy environment. Multi-tenancy refers to the ability to host a single instance of a software solution that serves multiple customers (e.g., organizations). In the multi-tenancy environment, each customer is a tenant who shares the cloud resources with other tenants or customers. In this multi-tenancy environment, each customer is usually provided with an account through which the customer can, following some form of identification, manage their data. In this shared environment, each tenant or customer is entitled to expect that the cloud service provider will maintain security including privacy. Customer data should remain secure and private from other customers or potential attackers. One way to achieve a level of security is to use encryption. Encryption in particular provides a level of privacy since a first customer who does not have knowledge of the encryption key used to encrypt a second customer data should be unable to read in plain text the second customer's encrypted data. To enforce security in such multi-tenancy environment, the encryption capability of the IBM FileNet P8 platform can be harnessed to provide security. A solution such as the IBM FileNet solution provides a Content Manager which includes versioning and life cycle management as well as security.

Typically, encryption key management is required to provide content security. This key management could be done in many ways. For example, the customer could first create a security key. However there is no guarantee that the key chosen by the customer will be compliant with the appropriate security standards. Unless the key is randomly generated and non-trivial, it may be fairly easy for an attacker to guess the key, exposing the customer's data to security vulnerabilities. It is the cloud provider's responsibility to provide security including privacy of customers' data, and this may not be achieved if the customer creates the cryptographic key.

To provide security, instead of having a security key generated by the customer, the cloud provider can generate the key. This allows the cloud provider to be confident that the cryptographic keys are compliant with the appropriate security requirements of the cryptographic standards. However, this does not ensure customer endorsement and safe storage of the generated keys on the customer's own data storage device, and so there is no assurance of the customer's own ability to decrypt stored data.

For the avoidance of doubt, the terms "including" and "comprising" as used throughout this specification are not to be construed as meaning "consisting only of" but are to be construed as non-exclusive terms.

BRIEF SUMMARY

The present invention provides a method for managing data security in a computing environment, and a computer system and computer program for implementing the method. The method comprises:

receiving, by a processor of a gateway server from a user device, at least one message, wherein each message requests that an encryption key be downloaded to the user device, and wherein the gateway server interfaces between the user device and a cloud comprising a plurality of interconnected computing systems external to the user device;

in response to the received at least one message: said processor generating at least one unique encryption key for each message, sending the at least one generated encryption key to the user device, and not storing any of the generated encryption keys in the cloud;

for each encryption key having been sent to the user device, said processor receiving each encryption key returned from the user device; and for each received encryption key, said processor storing each received encryption key in the cloud at a time specific to each received encryption key.

BRIEF DESCRIPTION OF THE DRAWINGS

Embodiments of the invention are described below with reference to the appended figures. It is understood that these figures only depict typical embodiments of the invention and are not in any way meant to limit the scope thereof. Therefore, the invention will be described in detail with reference to the accompanying Figures.

FIGS. 9, 10, 11 and 12 show tables illustrating various key management embodiments of the present invention.

DETAILED DESCRIPTION

Figure 1:
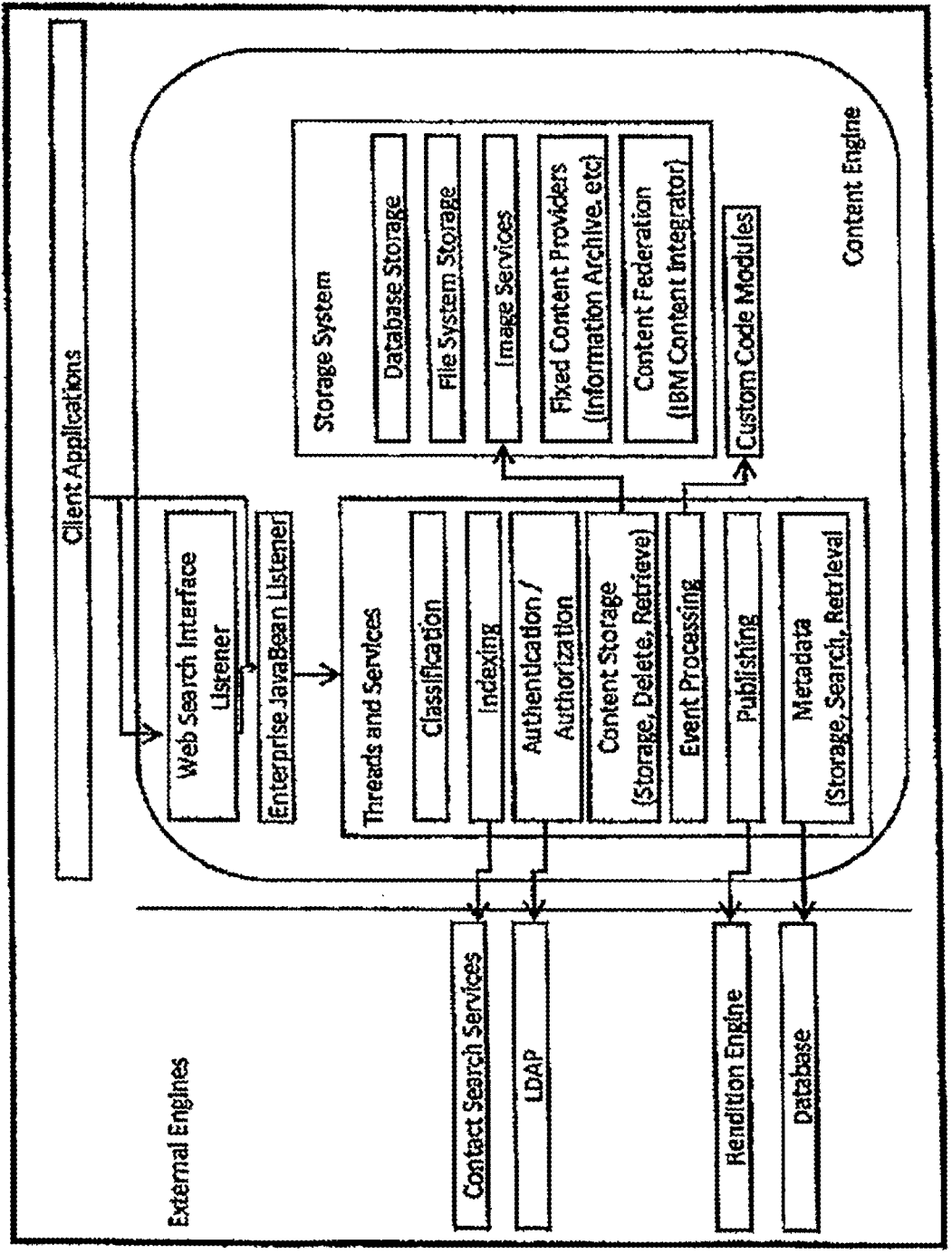
FIG. 1 schematically depicts a Content Engine internal system architecture, in accordance with embodiments of the present invention.

The present invention provides a method for managing cryptographic keys associated with a secure storage service, comprising: generating an encryption key at a first data processing apparatus associated with the secure storage service; prompting a user of the secure storage service, who connects to the first data processing system via a network, to initiate downloading of the generated encryption key to a second data processing apparatus associated with the user; and in response to the downloading, prompting the user to initiate saving of the key at the first data processing apparatus, such that the key is available for use to encrypt data that is to be stored using the secure storage service. The second data processing apparatus may provide a portal application for managing storage and retrieval of user documents, the portal application comprising a user interface that requires user confirmation of acceptance of the encryption key, by initiating downloading of the key to the user's data processing apparatus, before enabling the key to be saved at the first data processing apparatus.

According to one embodiment of the invention, the user interface requires user initiation of saving of the encryption key on the first data processing apparatus, before the key is available for use with the secure storage service.

In one embodiment, the portal application comprises a set of functions implemented in computer program code, for: receiving user-input documents, encrypting them using the user's encryption key, and saving the encrypted documents to a non-volatile storage; and/or searching for and/or retrieving documents from the non-volatile storage.

The present invention provides a method of managing a cryptographic key for use in encryption and decryption of data that is to be stored via a secure storage service, the method being characterized in that, via a user interface, the user is prompted to: trigger the key generation; initiate a download of the generated key to a device associated with the user; and save the generated key for use in encryption of the user's documents following the download of the key onto a customer device.

A random and non-trivial key generation method is employed in one embodiment, to run on a data processing apparatus associated with the secure storage service. After the key is generated, the customer is given the opportunity to approve and download the key, or to trigger generation of a different key. Downloading the key onto the customer device advantageously provides a backup copy that is available to the customer, enabling the customer to have confidence that data which is subsequently encrypted and saved via the secure storage service will remain recoverable. This is advantageous when the secure storage service is providing archiving and retrieval services, such as in an information lifecycle management cloud storage managed service environment.

In one embodiment, the key that is generated is not validated for use in secure data storage unless the customer both downloads the key to the user's system and saves the key on the first data processing apparatus that is associated with the secure storage service. This advantageously gives the customer control over which key is valid for protecting the customer data, and hence control over the customer data even when stored on the cloud by a cloud storage service provider using physically distributed storage.

In one embodiment, the key that is generated is discarded if the customer either does not download the key to a local device or does not save the key at the first data processing apparatus. This advantageously permits the customer to generate an arbitrary number of keys before the customer selects a key which will be saved and validated.

In one embodiment, the user interface is a web user interface.

A portal interface based, for example, on a user friendly SCCM web customer user interface facilitates the management of a key exchange between a cloud service provider's data processing apparatus (which provides the portal interface) and the customer's device. The user may connect to the portal via a Virtual Private Network (VPN) to provide a secure first network connection, and then the cloud service provider's data processing apparatus implements encryption to protect the customer's data when sending to storage over a second network connection and when holding the data in cloud storage.

In one embodiment, the key is generated by a key generating entity running on a gateway server that provides access to cloud services, and said key generating entity controls access and configuration of customers and controls storage of the customer data.

In one embodiment of the invention, there is provided a method of managing a plurality of keys for a plurality of customers who share a secure storage facility for storing their respective data, wherein each customer's stored data is protected with a respective key.

In one embodiment, different customers' stored data are segregated by being protected with the respective customer keys and/or by means of specific virtual disks being assigned to individual customers.

In one embodiment, the generating entity is a secure web access server, or a node or a router capable of implementing a secure web access.

In one embodiment, the customer triggers the key generation by sending a secure signal to a cloud gateway server and the key is generated by the generating entity on reception of said signal.

In one embodiment, the customer saves the key by sending the key from the customer device to the secure storage service.

In one embodiment, a first key is generated and saved at a cloud gateway server at a first validation time, and said first key is used for encrypting and/or decrypting the customer data that needs to be stored, from the first validation time until a second validation time later than the first validation time when a second key for protecting the customer data is generated and saved.

In one embodiment, after saving the second key, the first key is still valid for decrypting the customer data stored before the second validation time and the second key is used for encrypting and/or decrypting data for storage after the second validation time.

In one embodiment, before saving the second key, the first key is used to decrypt the customer data, and after saving the second key, the un-encrypted customer data is encrypted with the second key and the first key is discarded.

In one embodiment, after the second validation time, said second key is used to encrypt the customer data encrypted with the first key, and decrypting the customer data comprises first decrypting with the second key and then decrypting with the first key.

In one embodiment, a generated key is used for signing the customer data for storing in the cloud.

The present invention provides a system comprising a computer system and means for managing a key according to any of the embodiments of the above described method. A data processing apparatus according to one embodiment comprises a user interface and a key management service enabling users to initiate cryptographic key generation, data storage and retrieval operations. The operations involve: generating an encryption key at a first data processing apparatus associated with the secure storage service; prompting a user of the secure storage service, who connects to the first data processing system via a network, to initiate downloading of the generated encryption key to a second data processing apparatus associated with the user; and in response to the downloading, prompting the user to initiate saving and validating of the key at the first data processing apparatus, such that the key is available for use to encrypt data that is to be stored using the secure storage service.

In one embodiment, the user interface is provided by a portal application, for users of the secure storage service to use as an access point when saving data to and retrieving data from the secure storage service. The portal comprises a user interface that requires user confirmation of acceptance of the encryption key, by initiating downloading of the key to the user's data processing apparatus, before enabling the key to be saved and validated at the first data processing apparatus. The interface may also require user initiation of saving and validating of the encryption key on the first data processing apparatus, before the key is available for use with the secure storage service.

In one embodiment, the present invention provides a data processing apparatus comprising: a storage management controller; a key generator for generating an encryption key for encrypting data that is to be stored; and a user interface providing a first user prompt, when a user is connected to the data processing apparatus via a network, to initiate downloading of the generated encryption key to a second data processing apparatus associated with the user; wherein the user interface provides a second user prompt, in response to the downloading, to initiate saving of the generated key, such that the key is only saved for active use to encrypt data if the user initiates downloading and then initiates saving.

In one embodiment, the storage management controller, key generator and user interface are provided by a content manager component (or "content engine") running on the data processing apparatus, and the storage management controller is configured to encrypt a user's data, using a generated key that has been saved for active use for that user's data, before sending the user's data to non-volatile storage.

In one embodiment, the storage management controller is configured to send the encrypted user's data to a set of virtual disks in shared non-volatile storage, wherein the virtual disks are associated with that user or a group of users of which the user is a member.

Embodiments of this invention disclose a new method, a new system and a computer program product for generating a key for securing customer data for storing on a cloud.

The present invention provides both an assurance of the level of security and cloud services customers with a backup copy of the keys used to protect their data.

FIG. 1 illustrates an example content manager component or "content engine" of a data processing system, in accordance with embodiments of the present invention. The content engine provides a series of services for creating, retrieving, updating, deleting and securing contents. Client applications can communicate with the content engine via a Web Services Interface Listener component or an Enterprise JavaBean Listener component that each provide an interface for processing documents from the client applications. In addition, the content manager component provides user interfaces for handling document life cycle and various actions. For example cloud based solutions such as the IBM SmartCloud Content Management solution include a user interface for the customer to configure the cloud storage service.

Figure 2:
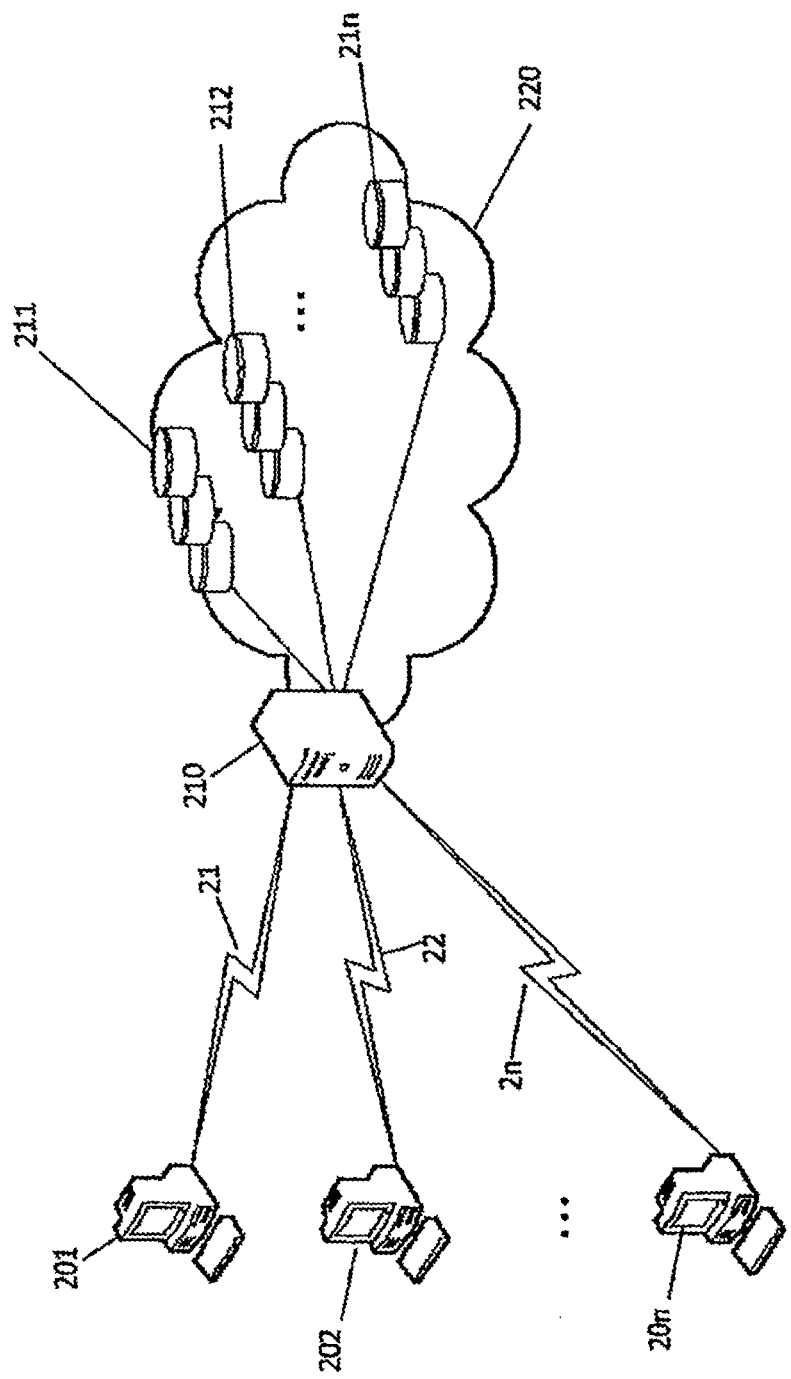
FIG. 2 schematically depicts the architecture of a cloud storage environment, in accordance with embodiments of the present invention.

FIG. 2 schematically depicts the architecture of a cloud storage environment, in accordance with embodiments of the present invention. The cloud storage environment includes a system comprising a plurality of customers (denoted as customers 1 to n), which are represented by computer devices in the form of desktop computers. Currently large cloud service providers manage data from several thousands of customers through several business data centres. It will be appreciated that a customer device may be of various forms including laptop computers, message processors, hand-held devices, multi-processor systems, microprocessor-based or programmable consumer electronic, Personal Computers, mainframe computers such as workstations, Personal Digital Assistants (PDAs) or Smartphones, pagers, routers, switches, and the like. It will be appreciated that each customer may own or be entitled to work on a plurality of such devices for accessing the cloud resources for professional and/or personal matters. A commercial customer such as an enterprise or an organization may have a plurality of workstations in its internal network. Typically, organizations have several users who are entitled to use the cloud services via a user interface. In the present description, it is assumed that it is a customer administrator who uses the cloud user interface for managing the security key. The management of the key is transparent to the other users of the organization. It will be appreciated that the customer administrator uses one of the customer devices for interacting via the user interface with the cloud and the customer administrator is capable of downloading data from the cloud to one of the customer devices. The customer administrator is also capable of saving data stored on the customer device to the cloud, via a gateway server 210 (hereinafter, "gateway 210") which provides a secure storage service for customer devices 201, 202, . . . , 20n for storing data at storage devices 211, 212, . . . , 21n, wherein n is a positive integer.

FIG. 2 further illustrates a shared managed storage cloud for storing data belonging to customers, via the gateway 210 at the edge of the shared managed storage cloud network. The cloud gateway is for example a server providing a secured web access interface for controlling the managed storage services cloud. A "cloud network" is understood to be a collection of links and/or nodes/entities interconnecting computer systems and/or entities and/or various electronic devices and enabling transport of data. The customer data is stored inside the network (e.g., IBM® data center) on physical disks but managed by storage controller software as virtual disks. The storage area of a customer may be represented by a set of virtual disks. The customer's storage cloud environment may be managed by a set of dedicated virtual machines. The communication between the dedicated virtual machines and the dedicated virtual disks may be using a set of Virtual Local Area Networks (VLANs).

Typically, the data stored in the cloud network is encrypted to provide privacy and integrity of the customer data. For example, an unauthorized user will be unable to read in plain text the customer data and will fail to modify the data.

FIG. 2 further illustrates a cloud environment where a plurality of customers may share common private or public resources through a private or public shared environment.

As a shared environment exposes data in the cloud environment to various risks, security in the cloud is partly provided through secure access via a secure connection. Each customer may for example be connected to the cloud via a Virtual Private Network (VPN) connection. The VPN connection is typically established between the customer (one of his devices) and a gateway at the edge of the network providing the cloud services. Internet Protocol (IP) security implemented in conventional VPNs employs a range of security services including encryption to provide confidentiality of the packetized data exchanged between the customer device (201, 202, . . . , 20n, wherein n is a positive integer) and the cloud 220 via the gateway 210. FIG. 2 illustrates a first VPN connection 21 between a first customer device 201 (indicated as customer 1) and the gateway 210, a second VPN 2 connection between a second customer device 202 and the gateway 210 and a nth VPN connection between a customer device 20n and the gateway 210. Each of the abovementioned individual secure connections from 21 to 2n is independent from each other, wherein n is a positive integer. Only one cloud gateway 210 is shown in FIG. 1 but of course several gateways may be used to enable customers to access their data stored in the cloud in one or more of storage devices 211, 212, . . . , 21n wherein n is a positive integer. Where there is no VPN connection between a customer and the cloud, other types of security mechanisms may be used to securely connect a customer device in a public domain to a cloud. Such mechanisms include known application and transport level security mechanisms such as Transport Layer Security, or Secure Socket Layer, or Pretty Group Privacy etc.

FIG. 2, FIG. 3, FIG. 6 and FIG. 8 describe various steps of the key management, in accordance with embodiments of the present invention. The key generation is initiated by the customer administrator on behalf of all the users (or employees) of an organization.

Figure 3:
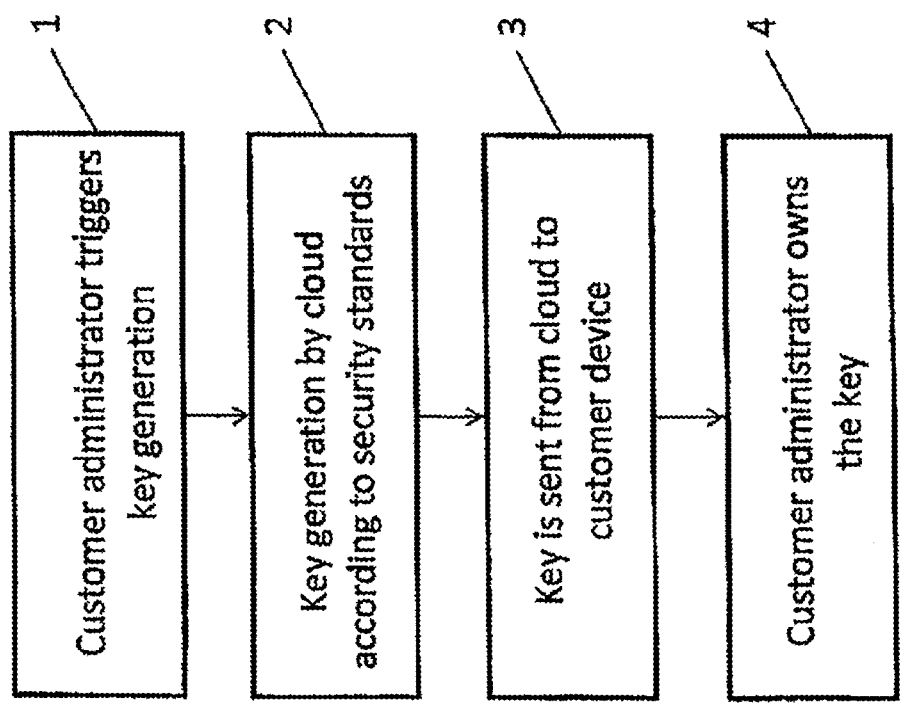
FIG. 3 illustrates a flow diagram of steps for generating and validating a storage key, in accordance with embodiments of the present invention.

FIG. 3 illustrates a flow diagram of steps for generating and validating a storage key, in accordance with embodiments of the present invention.

In step 1 of FIG. 3, the customer administrator triggers the key generation. Triggering the key generation can occur whenever the customer administrator wishes. For example it can occur whenever the IT administrator wishes to modify the key after a long time using the same key. It can also occur when the customer administrator logs on the cloud during a boarding process or whenever the customer administrator logs on the cloud. Triggering the key generation can be initiated by an action indicating the intent to store or to archive files on the cloud. Triggering the key generation is done via a user interface such as a web interface presented in FIG. 8. The customer administrator is presented with a security configuration page containing for example information about the security setting concerning users or groups of users, and/or their roles.

Figure 8:
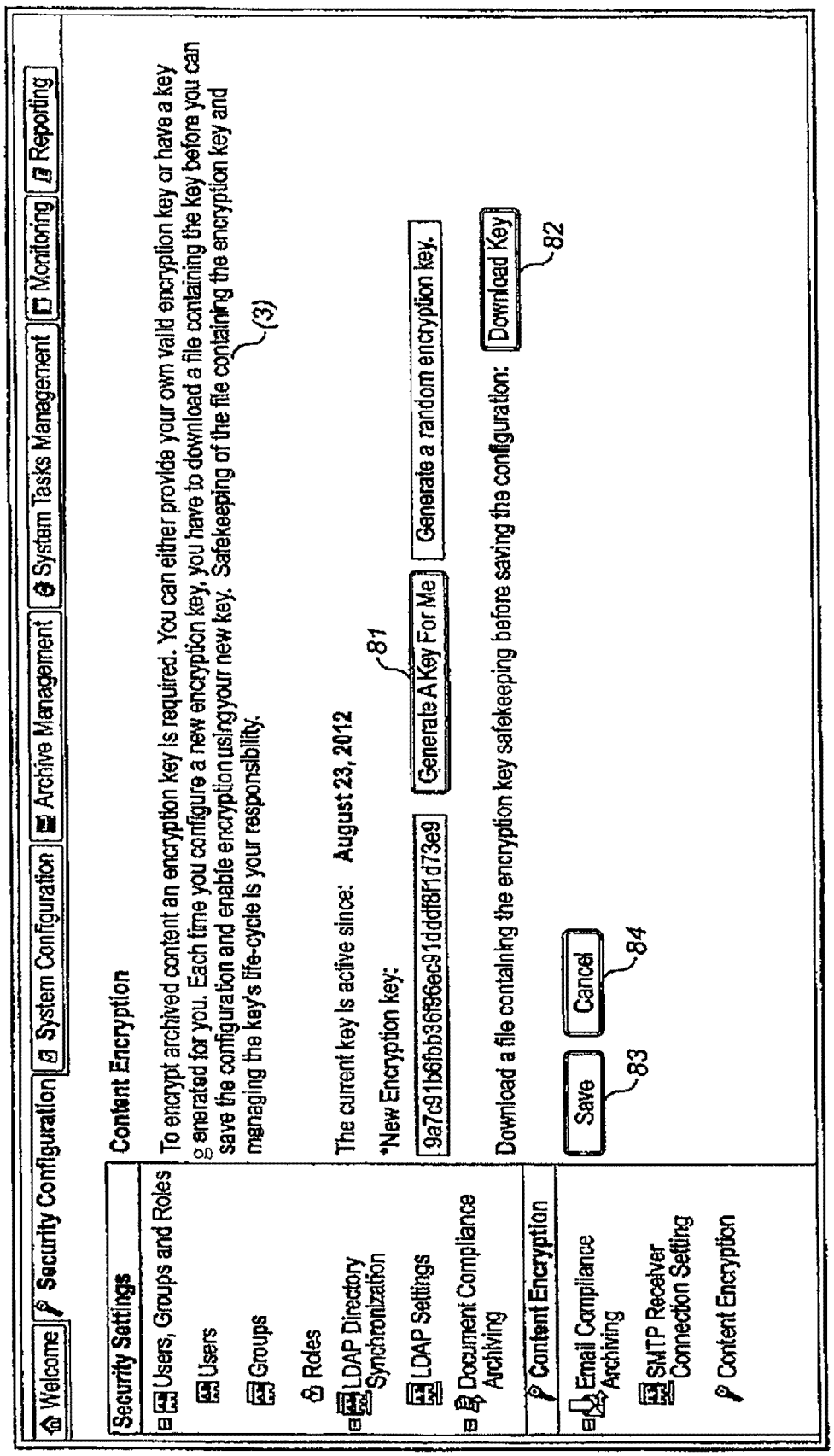
FIG. 8 illustrates a user interface, in accordance with embodiments of the invention.

FIG. 8 shows an exemplary user interface with a button indicating "Generate A Key For Me" 81, in accordance with embodiments of the present invention. By pushing this button 81, the customer administrator triggers the generation of the key.

Figure 6:
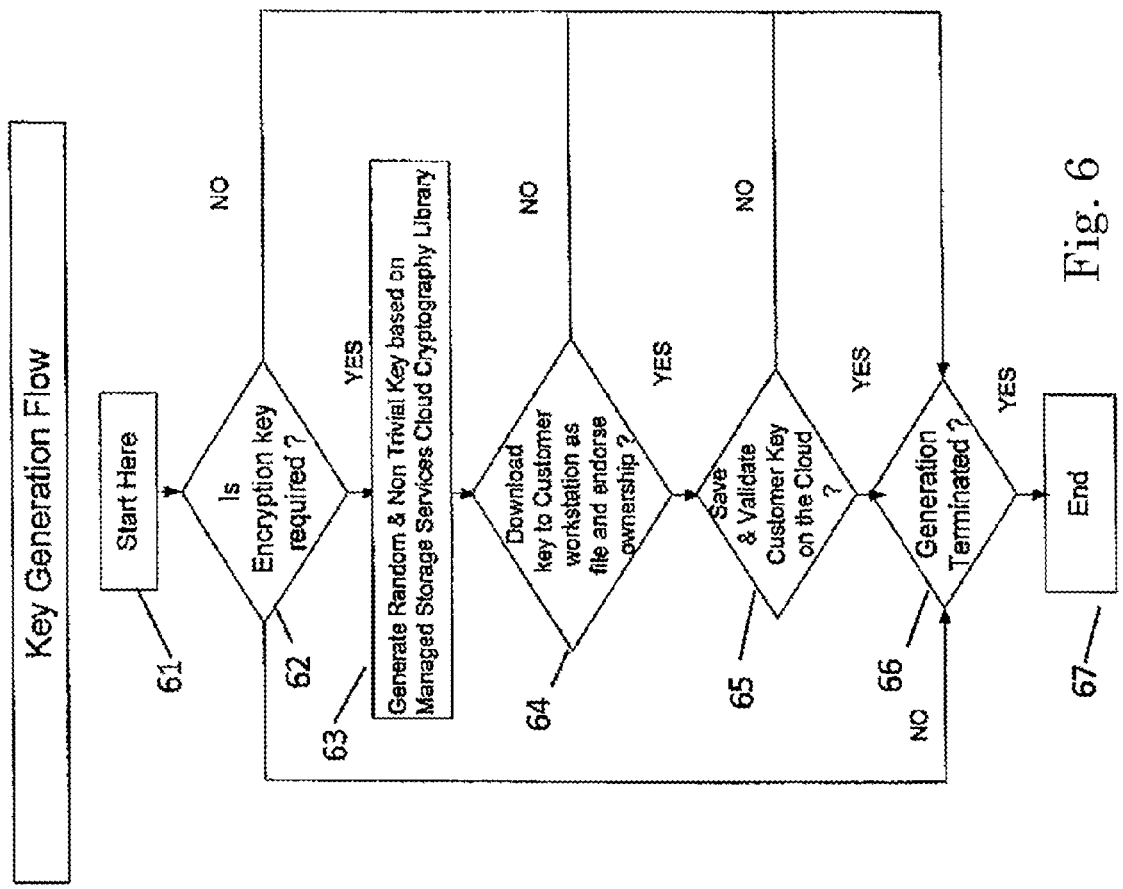
FIG. 6 illustrates a key generation flow chart, in accordance with embodiments of the present invention.

The action of triggering the generation of the key by pushing button 81, for example, corresponds to the positive transition (YES) between check step 62 and step 63 of FIG. 6. A trigger can be provided by a signal securely sent from the customer administrator device (e.g., workstation) to the cloud. Such signal can be a message sent through a VPN (e.g., VPN1 21 from the customer device 201 to the cloud in FIG. 2). The signal triggering the key generation is received by an entity of the cloud (e.g., gateway 210). It is assumed that the entity which receives the trigger from the customer administrator device authenticates the trigger as being originated from an authorized customer. Such authorization can be provided through security means such as source authentication provided in VPNs. Other certificate based authentications mechanisms may be used for authenticating a customer triggering a key generation.

Before the user can enable the usage of the generated encryption key by pressing the save button, the user must click the "Download Key" button 82 which will open a download window from the browser and allow the user to save a text file containing the generated key, thus enforcing the user's endorsement of the key. The save button 83 on the page will be enabled only after the download action has been performed. By pressing the save button 83, the encryption key is configured and enabled in the content management system and will be used for the encryption of all documents archived thereafter.

Step 2 of FIG. 3 or step 63 of FIG. 6 corresponding to the key generation by the cloud is described now. It is assumed that the key is generated once the trigger from the customer is authenticated. The key can be generated by a cloud gateway 210 or by another entity. Said key is generated on behalf of the customer who triggered its generation. When the key (e.g., encryption key) is triggered manually by the user pressing the "Generate" button on the portal page, a random, non-trivial key is generated according to an implementation of a Java Cryptography Extension API (JCE). It is a lot more difficult for an attacker to guess a truly random key because a random key would only be determinable by searching through a very large space of possibilities. A truly random key makes it more difficult for an attacker to attack (decrypt and/or modify/tamper . . . ) the protected data. The encryption key generated according to embodiments of this invention is compliant with the security standards such as the Federal Information Processing Standard (FIPS 140). Other security standards may be used for the encryption key generation.

The encryption key generated can be a character string and can be of various sizes. Typically key sizes employed by standard encryption FIPS approved cryptographic algorithms have length in the ranges of 128 bits, 192 bits or 256 bits (e.g., AES or the Advanced Encryption Standard algorithm). Keys whose sizes differ from the abovementioned sizes can also be generated. Other employable keys include Wi-Fi Protected Access (WPA) keys on 504 bits or 160 bits, Wired Equivalent privacy (WEP) Keys on 64 bits or 128 bits, 152 bits or 256 bits. Some known WEP key generators are used for generating random WEP keys of particular length. Document "Request For Comments 1750 (RFC 1750)" entitled "Randomness Recommendations for Security" indicated that a key length consisting of 128 bits of randomness provided a very high security cryptographic key. The following summarizes a few techniques that can be used to generate a truly random quantity for key generation as indicated in RFC 1750. Mixing a large number of uncorrelated sources with a strong mixing function may be used to obtain a random input having unguessable random numbers. A strong mixing function has the property of combining at least two inputs and producing an output wherein each output bit is a different complex non-linear function of all the input bits. Mixing functions includes for example the trivial "Exclusive Or" function. Mixing a random bit with a constant bit with "Exclusive Or" will produce a random bit. Other stronger mixing functions include the Data Encryption Standard (DES) which takes up to 120 bits of inputs and produces 64 bits of output. Each bit of the output thus generated is dependent on a complex non-linear function of all input bits. Other example of strong mixing functions is the cryptographic hash function commonly known as "message digest" such as the Secure Hash Standard (SHS) and the MD2, MD4, MD5 series. The latter series is defined in the standard document "Request for Comments" RFC 1321. Each of these functions takes an arbitrary amount of inputs and produces an output mixing all the input bits. The SHS produces 160 bits of output and each of the MD hash functions produces a 128 bits hash value. Note also that the draft FIPS 180-3 specifies five secure hash algorithms: SHA-1, SHA-224, SHA-256, SHA-384 and SHA-512 which produce 160, 224, 256, 384, 512 bit outputs, respectively. It should also be noted that DES and other encryption functions can be used to combine any number of inputs. The well-known "Diffie-Hellman" technique can also be considered to produce randomness required in the key generation. It should be noted that the random key can be either hardware generated or software generated by using at least two sources of inputs and a strong mixing function. An example of hardware source of input for randomness is audio input with thermal noise, or radioactive decay, or disk drive timing affected by air turbulence. Other sources of randomness include system clocks, input/output buffers, user inputs, hardware serial number etc.

Once generated by the cloud, the key is displayed on the user interface. In an example, FIG. 8 displays "9a7c91b6fbb36f95ec91dddf3f1d73e9" which is a 128 bit key.

Step 2 of FIG. 3 comprises the check step 64 of FIG. 6 in which the customer administrator is offered the possibility to download the key on the customer administrator's device (e.g., workstation). This can be done by means of a "Download key" button appearing on the user interface (numeral 82 in FIG. 8) and enabling the customer administrator to initiate the download of the key. Pushing the "Download key" button on the user interface will execute the downloading of a file containing the key from the cloud (e.g., from the entity generating the key) to the workstation of the customer administrator.

Step 3 of FIG. 3 describes the download of the key from the cloud to the customer administrator device. The key can be transported by means of FTP download, web download or explorer download or other transport means. A typical download mechanism would involve a client (e.g., FTP client, web client . . . ) running on the customer administrator workstation and a server (e.g., FTP server, web server . . . ) in the cloud. It is assumed that the download relies on a secure transport link established between the customer administrator device and the entity sending the key (e.g., VPN links 21, 22, 2n as in FIG. 2). However, if the customer administrator device is attached to a non-secure network and there is no secure network connection (no VPN) between the customer network and the cloud, it is recommended to transport the key by means of another secure application protocol including TLS, SSH etc. Note that once the key is downloaded on the customer administrator device, the customer administrator is able to open the file containing the key in plain text. The portal application may warn the customer administrator through the user interface that the customer administrator is responsible for the safekeeping and managing the lifecycle of the key. Note that FIG. 8 illustrates an exemplary note '(3)' indicating that the customer administrator is reminded that the customer administrator is responsible for safekeeping of the downloaded key.

Once downloaded securely on the customer administrator workstation, the encryption key is available for storage on the cloud. Note that at this stage, although the cloud had generated the encryption key, the encryption key was not saved (i.e., not stored) yet on the cloud as being a valid key. Confirmation, at the customer administrator workstation, of acceptance of the encryption key, by initiating downloading of the encryption key to the customer administrator workstation, is required before enabling the encryption key to be saved (i.e., stored) in the cloud. The encryption key becomes available to encrypt data that is to be saved (i.e., stored) on the cloud only upon successful storing of the encryption key on the cloud.

Step 4 of FIG. 3 is a step that results from a positive transition from check step 65 in FIG. 6. After download of the key, the customer administrator is offered through the user interface to save the key on the cloud (check step 65 in FIG. 6). It is noted that the customer administrator is not offered the possibility to save the key on the cloud prior to the download of the key on the customer administrator's workstation. FIG. 8 illustrates an exemplary "Save" button 83 on the user interface which is not activeable unless the download of the key is complete. Once the key download is complete, the "Save" button 83 may change color (e.g., turning from pale grey to bold grey) to indicate that the customer administrator can now save the key on the cloud by pushing the "Save" button. The customer administrator now owns the key because the customer administrator has endorsed the key by downloading the key on the workstation and saving the key on the cloud as the valid key for protecting the customer data (step 4 of FIG. 3). FIG. 8 also includes a "Cancel" button 84.

Flow charts in FIGS. 4 to 7 describe logic operations as implemented by the portal application and system for allowing configuration of data structure and key management for using the cloud, in accordance with embodiments of the present invention.

Figure 4:
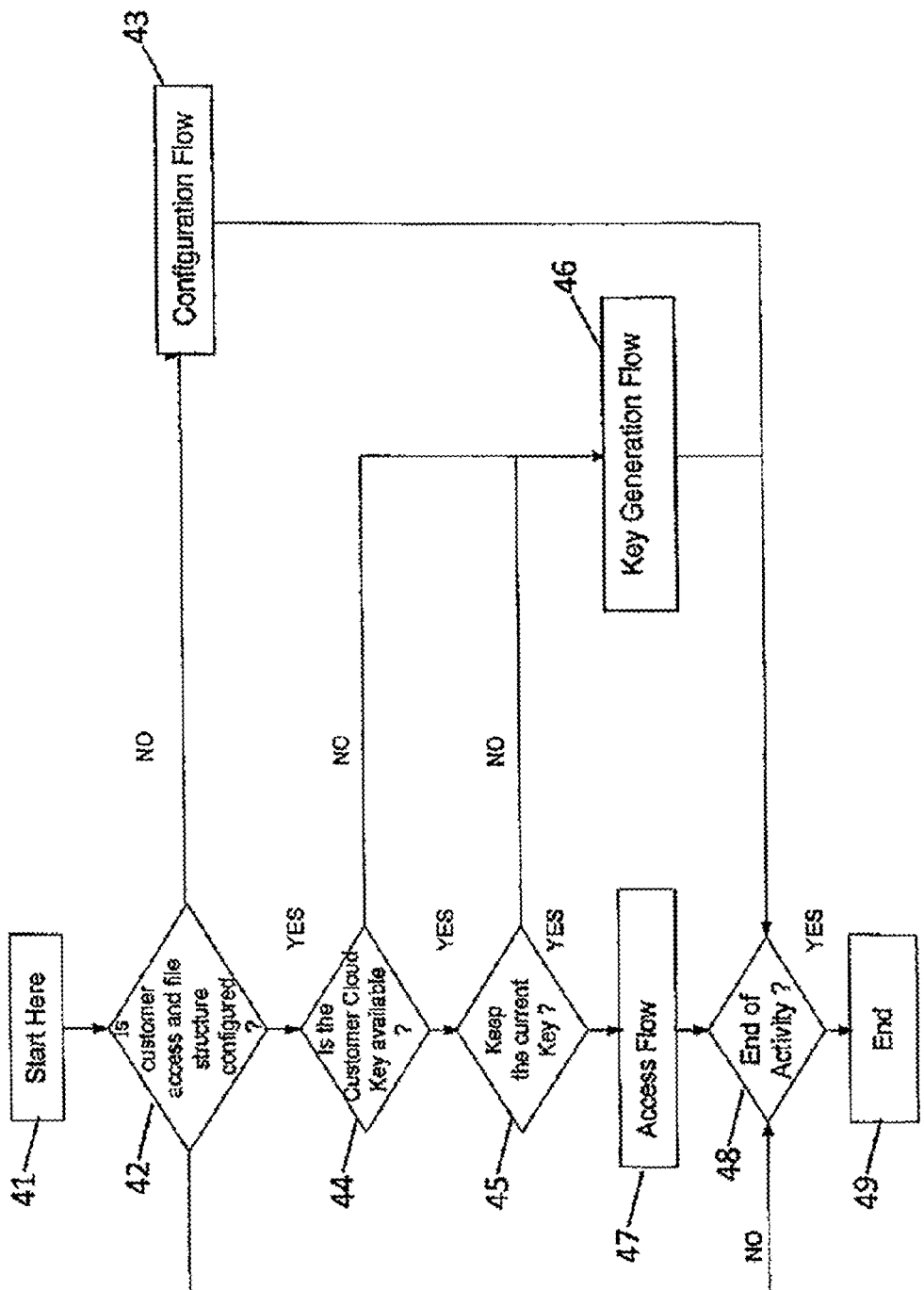
FIG. 4 and FIG. 5 illustrate configuration flow charts, in accordance with embodiments of the present invention.

Before a user of an organization (e.g., company employee) is able to use the cloud resources (storing files, retrieving files, searching files, etc.), the system administrator of the organization or the customer administrator needs to configure the customer data structure (e.g., configure the archives) in the cloud and configure the key(s). FIG. 4, which starts at step 41, illustrates a managed storage service cloud customer flow in which the customer administrator is led to configure the customer access and file structure and the key, in accordance with embodiments of the present invention. If the customer access and file structure are not configured, the customer administrator will have to configure the customer access and file structure by entering the configuration flow in step 43. The configuration flow is further described below in FIG. 5. If a customer access and file structure is already configured (positive transition from check step 42), another check step 44 is entered for checking if the customer key is available. If the customer key is available, the administrator will have the opportunity to keep the current key for performing an access flow (step 47). The access flow describes a sequence of steps featuring the possible actions of a user accessing the resources of the cloud. For example any user of the customer configured to use some archives on the cloud can now access the cloud using the key in a transparent way. As mentioned before, user operations when accessing the cloud include retrieving data and/or uploading data and/or searching data, etc. The access flow diagram (step 47) is further described in FIG. 7.

Step 48 determines whether the activity of the process of FIG. 4 has ended. If so, the process of FIG. 4 ends (step 49). If not, the process of FIG. 4 loops back to step 42.

If after the customer administrator had already defined different accesses and file structures (check step 42) for the users, the key to enable the user to access these file structures is not available yet (negative transition (NO) from check step 44) and the system administrator is instructed to generate the key by entering the key generation flow (step 46). Similarly, if after access and file structure configuration (step 42) and a previous key validation (check step 44), the customer administrator decides to generate a new key such as when the administrator is not wishing to use the same key (negative transition (NO) from check step 45) the administrator performs key generation in step 46. Note that the key generation flow of step 46 is further described in detail in FIG. 6.

The customer administrator is responsible for defining the customer file structure (e.g., the structure of archives). A typical file structure may include categories of documents. Several categories of documents for example tax documents, bonds, etc. can be archived. Of course the customer administrator in charge of configuring the file structure will select the way of archiving according to different categories. Each category of document or each document stored may have its own retention period which is the length of time for which an organization or a customer is expected to retain a type of document or a particular document. For example in certain countries, some privacy protection law may forbid organizations to retain some types of personal documents for more than a certain period of time. Of course several archiving solutions will offer various ways of defining a file structure.

The following description provides some implementation details for performing the operations of the portal application. The system providing the portal is a compliance archiving system based on the integration of various middleware products. These middleware products include a content management solution, a full-text indexing engine, a full-text indexing engine, a document legal discovery solution, and a statistics and reporting solution.

The content management solution provides the base functionality of archiving documents on a file system. Each document, when it is archived, can be enriched with metadata (associated properties and document classes) saved in a database. This is known as document indexing.

The full-text indexing engine allows running full-text searches on all archived documents The document retention management solution (i.e. "record management") provides the ability to manage the life-cycle of all documents. When an archived document is declared as a record, the document is associated with a record category that is managed by a retention policy. The record categories form a folder like hierarchy called "file plan". The retention policy defines the life-cycle of the document and can trigger the document deletion during a so called "disposition sweep" execution. The content management solution provides the ability to encrypt the content using user defined encryption keys.

The document legal discovery solution that allows full-text searches on the archived content that is relevant to a legal case. Upon search completion, the resulting documents can then be "placed on hold" in the content management system, thus forbidding any document deletion operation to all users until the legal case is over and the document holds are removed.

The statistics and reporting solution is used to build various reports like an archive usage reports (in terms of used disc space) or a user audit report for example.

The content management solution and the legal discovery solution provide their own end user clients which are directly accessible to the solution end users. The configuration aspects of the content management and record management solutions requires the development of the SCCM Administration Client web application (also described as "the Portal"). With that web application, the users can configure and manage the solution from an administration point of view which may include inter alia: defining the document metadata templates and the document class hierarchy; defining the record categories (file plan) and retention policies; defining and enable the content encryption keys; definingusers, groups and roles; setting up user notifications; scheduling system tasks like the above mentioned "disposal sweeps"; scheduling automated report creation and monitor running system tasks; and visualizing generated reports.

The system provides a document processing component that enable automatic prosecution of a set of documents through a batch job. Batch load jobs can be scheduled through the portal and a metadata file provided together with the set of documents can describe how the documents should be classified during the prosecution.

Figure 5:
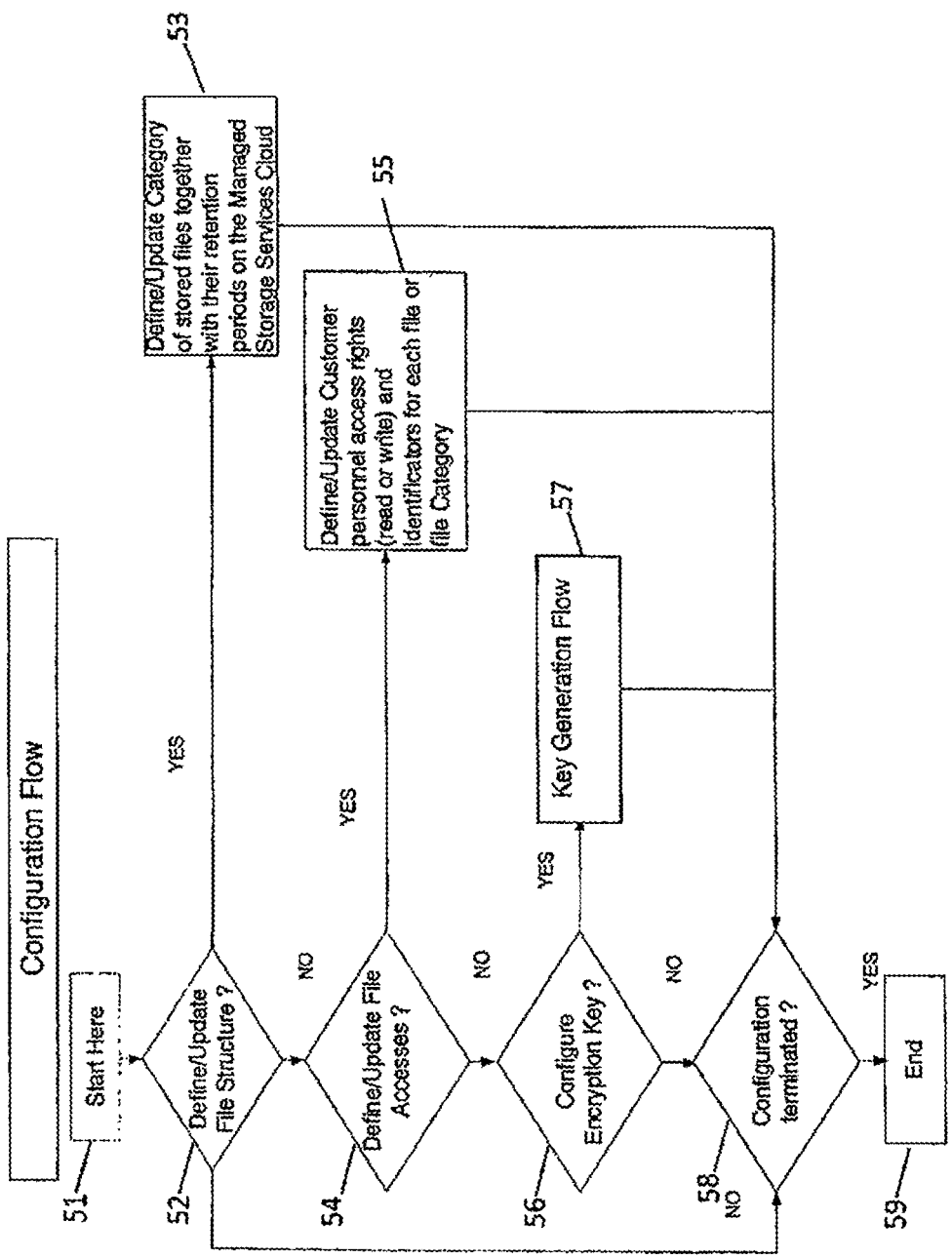

The file structure configuration flow of FIG. 5, which starts at step 51, is now described in accordance with embodiments of the present invention. In step 52, a check is performed about whether the customer administrator is wishing to define and/or update a file structure. If the customer administrator decides to define and/or update the file structure, step 53 is entered. In step 53, several archiving configurations can be considered. FIG. 5 indicates that the retention period is configured while defining and/or updating the category of files on the cloud. If however defining and/or updating a file structure is not required, another check is performed in step 54 to find out whether defining and/or updating file accesses is required. File access refers for example to the right that each user (e.g., employee of an organization) has to access a particular category of stored files or a particular stored file. If the file accesses are to be defined by the customer administrator, then step 55 is entered. The customer administrator then may define and/or may update the personnel access rights of the users. The customer administrator may also provide permissions for each file or file category. For example it can be defined whether certain users or all users are allowed to read or to write certain categories of files or certain files on the cloud. If defining and/or updating file access is not required (negative transition (NO) from check step 54), a test (check step 56) about whether a key is to be configured is performed. FIG. 5 determines (check step 56) whether an encryption key configuration is needed. If a key is to be configured, the key generation flow as described in FIG. 6 is carried out. Finally if a key configuration is not required, the configuration flow enters step 58. From check step 58, step 59 is entered when the configuration is terminated. Each of the steps 53, 55, 57 enters the check step 58 before ending the configuration flow in step 59 or restarting it in step 52. If the configuration is not terminated in step 58, the process of FIG. 5 loops back to step 52.

FIG. 6 which is the key generation flow diagram according to embodiments of the present invention is described hereunder. FIG. 6 starts at step 61. In step 62, a check about whether a key (e.g., encryption key) is required. If a key is not required, the flow enters step 66 for checking whether the key generation is terminated. If the key generation is not completed yet, the flow goes back to step 62. If in contrast a key is required, step 63 performs a key generation according to the description provided in step 2 of FIG. 3. As previously indicated, the key generated by the cloud is random and non-trivial and based on a managed storage services cloud cryptography library. After the generation of the key, if the administrator does not wish to download the key to his workstation (negative transition (NO) from check step 64), the process of key generation reaches step 66 where a check is performed about whether the key generation is terminated. If the customer administrator decides to endorse the ownership of the key by downloading the key on his workstation, the customer administrator still needs to save the key on the cloud to validate it before completion of the key generation flow. If the customer administrator saves and validates the customer key on the cloud (positive transition (YES) from check step 65), step 66 is next executed. If the customer administrator does not save and validate the customer key on the cloud (negative transition (NO) from check step 65), and decides to end the generation of the key (positive transition (YES) from check step 66), the key generation process ends in step 67. Otherwise, after the negative transition (NO) from check step 65, a new key generation will be proposed (negative transition (NO) from check step 66) by looping back to step 62. Note that after the customer administrator wishes to save and validate the customer key on the cloud, the customer administrator can still decide to generate a new key for the purpose of allowing access to the users. In that case, a new key generation will be proposed and the flow will start once again in step 62. Note that when a first key had been generated with the customer administrator taking ownership of the key, and the customer administrator decides to generate a second key after the generation of the first key, the first key generated may become un-usable for further data protection (e.g., encryption). The customer administrator will then be permitted to generate a new key by re-entering the key generation flow in step 62 from check step 66 without entering step 67.

As noted before, a user of an organization may execute a number of operations in relation to the cloud. These operations include storing files, retrieving files, or searching for files already stored as archives for example. Prior to executing these operations, a user needs to access the cloud.

Figure 7:
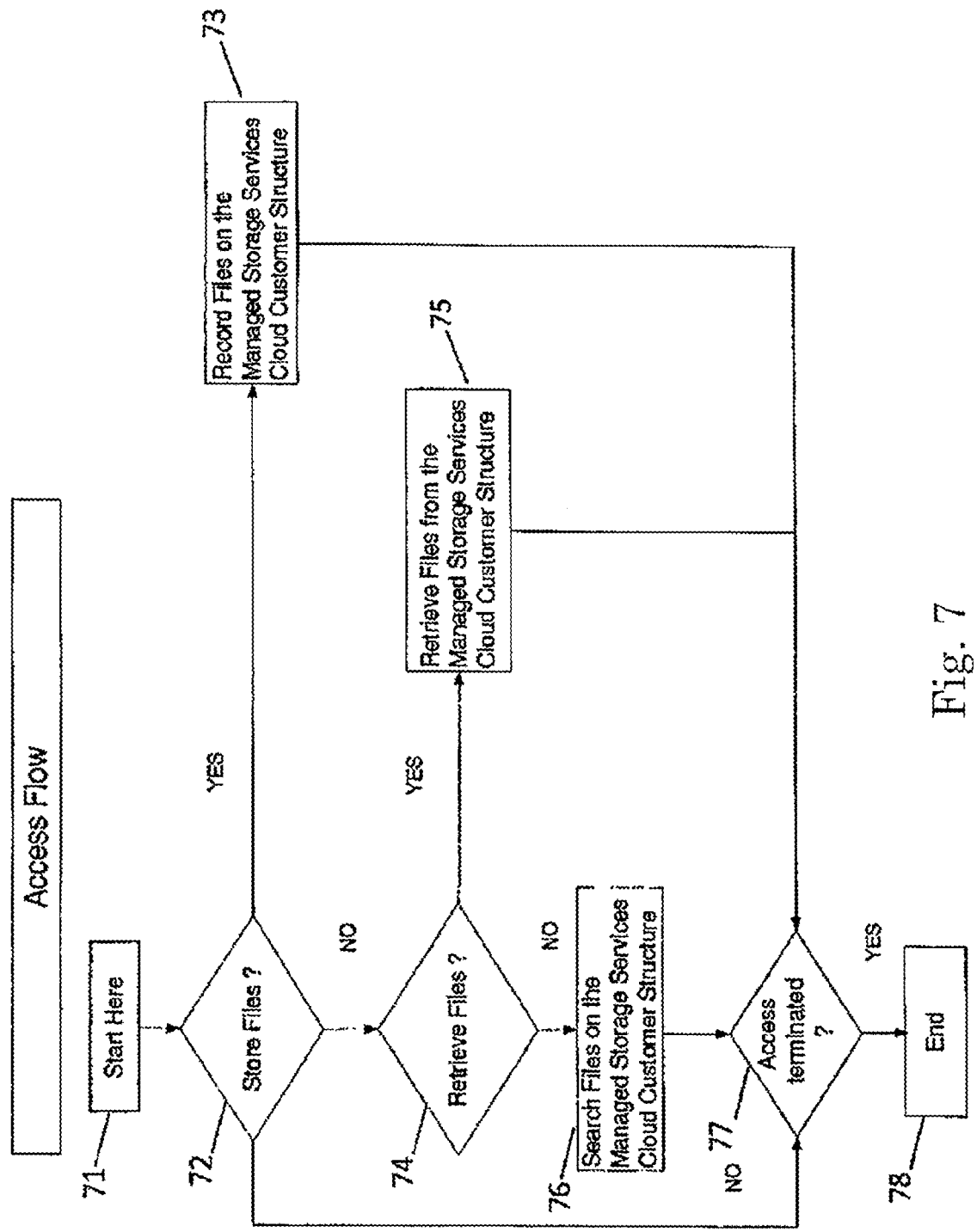
FIG. 7 illustrates an access flow chart, in accordance with embodiments of the present invention.

FIG. 7 describes a set of access flow operations that may take place between the moment a user accesses the cloud (step 71) through login for example and the moment the access to the cloud is terminated (step 78), in accordance with embodiments of the present invention.

In step 72, a check is performed as to whether storage of files is desired. If it is, step 73 is executed. Step 73 records the files on the cloud. The files of a user are recorded on a managed storage services cloud customer structure. Thereafter, a test 77 about whether the access is terminated is performed. Unless the access is terminated (step 78), a check as defined in step 72 above is performed. If there is no file to be stored on the cloud, retrieval of files (e.g., encrypted data) may be performed by the user (step 74). If the user wishes to retrieve data or contents from the cloud, said retrieval will take place in step 75 labelled "Retrieve Files from the Managed Storage Service Cloud Customer Structure". Step 76 labelled "Search Files on the Managed Storage Service Cloud Customer Structure" indicates that the user is undertaking a file search on the cloud. The file search executed by the user on the cloud can be made on the basis of the date at which the file was archived on the cloud and/or by the type or category of file and/or by author of the file or document etc. Searching encrypted files on the cloud can be done by searching for example unencrypted identifiers indexing the files. Alternatively searching files may use the key configured by the administrator to decrypt encrypted identifiers indexing the files.

The following description provides additional features of the content encryption engine as developed in an implementation of the invention. The content encryption and decryption functionality is a feature provided by the content management system. As indicated before, content encryption helps providing confidentiality of the content that is added to a storage area in case the content is accessed from outside of the system. This encryption pertains only to the storage of content in the storage area: when a Content Engine retrieves and passes content to a client in response to a client request, the content is automatically decrypted. In the currently developed solution Content Engine encrypts and decrypts content with, for example, a 128-bit encryption key that is generated with a Federal Information Processing Standards (FIPS) 140-compliant algorithm. A new key is generated whenever encryption is enabled for the storage area. For example, when encryption is enabled, one encryption key exists, and that key is used to encrypt any new content. If encryption is re-enabled, two encryption keys now exist, and the most recent key is used to encrypt new content. If encryption is re-enabled again, three encryption keys now exist, and so on. The storage area encryption keys are stored in a secure form in the object store database.

Using a solution Administrative Client, the customer defines and enables an encryption key in the content management system. Document decryption is provided on-thefly when a document is later accessed by a user through the standard content management end user client. That functionality is not related to the solution Administration Client since no documents can be accessed through it.

Next described are embodiments of the method highlighted above of managing several keys generated at different times for protecting a customer user contents on the cloud. In the following examples, each key referred to is an encryption key for encrypting and decrypting data. However, it is understood that other types of key could be used in embodiments of the invention.

In an embodiment of the invention, keys previously validated are still valid after generation and validation of new keys. FIG. 9 illustrates this embodiment. FIG. 9 is a table that displays the association between a list of keys (e.g., encryption keys) and a customer contents (e.g., files) together with some time information, in accordance with embodiments of the present invention. This table of association could be stored on a cloud server such as the gateway 210. The validation time column contains the time at which an encryption key has been validated on the cloud for the customer contents (emails, words documents . . . ). Key-1 911 was validated on Jan. 1, 2012 (913) and key-2 921 was validated on Jan. 1, 2013 (923). In this example in FIG. 9, key-1 911 is stored in association with the customer files 'XXX' 912 which were stored on the cloud on Mar. 21, 2012 (914). This indicates that key-1 911 had been used for encrypting these files 912. The second line of the table in FIG. 9 indicates that the second key (key-2) 921 was validated on Jan. 1, 2013. Key-2 was used to encrypt files 'XXY' 922 because files 922 were stored on the cloud after Jan. 1, 2013, namely Jan. 15, 2013 (924). In this embodiment, key-2 921 is needed to decrypt files 'XXY', while key-1 911 is still valid for decrypting files stored on the cloud between Jan. 1, 2012 and Jan. 1, 2013. These files decryptable with key-1 911 after Jan. 1, 2013 include encrypted files 'Ekey-1 (Files XXX)' 912.

In accordance with embodiments of the present invention as illustrated in FIGS. 10 and 11, a key previously validated is valid until a new key is validated on the cloud. In this embodiment, the previously validated key is retired or abandoned when the new key is validated. In this embodiment, the files stored before the validation of the new key which are encrypted with the previous key are decrypted with the previous key before the retirement thereof. Note that the decryption of previously stored data with the previous key can be simultaneous with the validation of the new key. And thereafter, the files stored prior to the validation of the new key are encrypted with the new key. Of course, any file stored on the cloud after the validation of the new key is encrypted with the new key. In FIGS. 10 and 11 illustrating this embodiment, the previously validated key is key-1 (1011) was validated Jan. 1, 2012 (1013, 1113) and the new key is key-2 (1121) was validated on Jan. 1, 2013 (1123). Files 'XXX' had been stored on Mar. 21, 2012 (1014, 1114) and encrypted since Mar. 21, 2012 with key-1 (1011) until Jan. 1, 2013 where, prior to key-1 retirement (1011 as active in FIGS. 10 and 1111 as retired in FIG. 11), encrypted files 'Ekey-1 (Files XXX)' 1012 are decrypted with key-1 (1011) and 'Files XXX' (1112) are encrypted again with key-2 (1121 of FIG. 11). Files XXY (1122) stored on Jan. 15, 2013 (1124), which is after Jan. 1, 2013, are encrypted with the new key key-2 (1121).

In another embodiment illustrated in FIG. 12, nested encryption is used. Each validated encryption key is saved in the customer dedicated data store and linked to the stored documents for which it has been used by the solution of the present invention. If the customer administrator is validating a second key after a while, any document stored after that second generation will be encrypted by the second key to which it will stay linked in the data store. When a document is retrieved by a customer user, the solution of the present invention decrypts it with its linked key. To illustrate this embodiment, it is provided the following example: when a new key is validated, it is used to encrypt all contents including the contents encrypted with the previous key. The previous key is kept valid for decrypting the contents stored before the validation of the new key. It can be seen in FIG. 12 illustrating this embodiment that the files 'XXX' (1212) which had been encrypted with the previous key key-1 1211 in the form 'Ekey-1(Files XXX)' 1212 are re-encrypted with the new key key-2 1221 from Jan. 1, 2013 (1223). The previous key key-1 1211 was validated on Jan. 1, 2012 (1213). After Jan. 1, 2013, the new form of the encrypted contents stored since Mar. 21, 2012 is then 'Ekey-2[Ekey-1(XXX)]' (1222). The data stored on the cloud from Jan. 1, 2013, will be encrypted with key-2 only (not shown in the figure). After that date of Jan. 1, 2013, retrieving the files 'Files XXX' which had been stored since Mar. 21, 2012 (1214, 1224), will involve decrypting first with key-2 and then decrypting with key-1. Nested encryption supposes that all the keys involved remain active.

Figure 13:
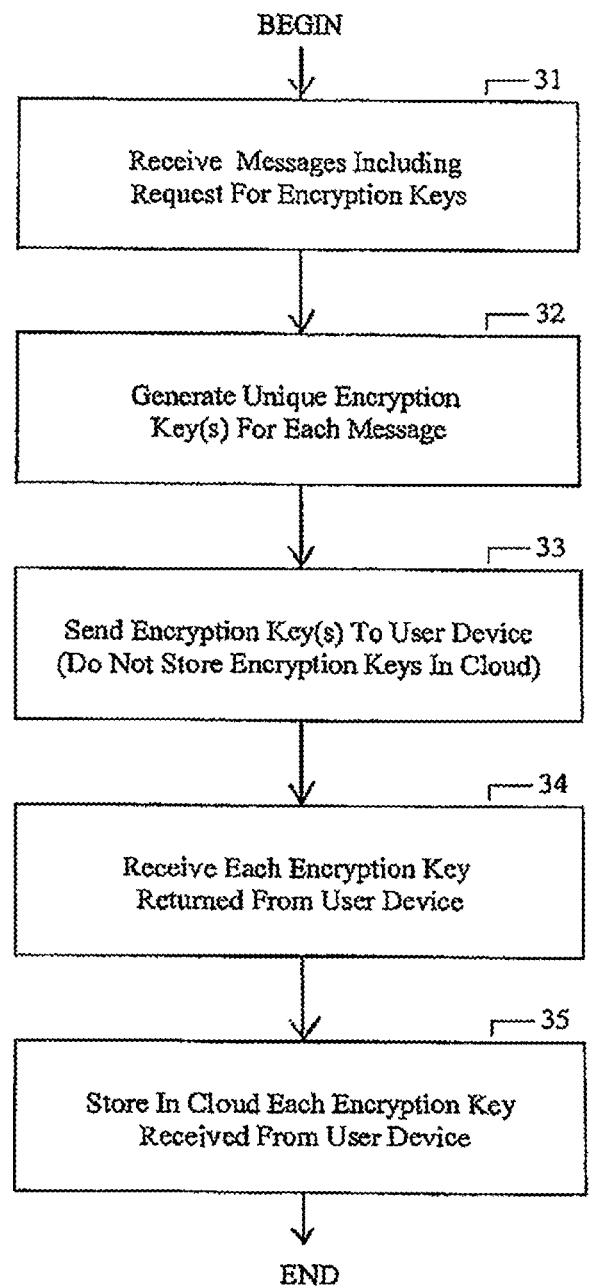
FIG. 13 is a flowchart describing a method for managing data security in a computing environment, in accordance with embodiments of the present invention.

FIG. 13 is a flowchart describing a method, which includes steps 31-35, for managing data security in a computing environment, in accordance with embodiments of the present invention.

In step 31, a processor at the gateway server 210 receives from a user device (201, 202, . . . , 20n), at least one message. Each message requests that an encryption key be downloaded to the user device. The gateway server 210 interfaces between the user device and the cloud 220 comprising a plurality of interconnected computing systems external to the user device.

In response to the received at least one message, the processor at the gateway server 210 generates at least one unique encryption key for each message (step 32) and sends the at least one generated encryption key to the user device (step 33), but does not store any of the generated encryption keys in the cloud 220.

In step 34, for each encryption key having been sent to the user device, the processor at the gateway server 210 receives each encryption key returned from the user device.

In step 35, for each encryption key received from the user device, the processor at the gateway server 210 stores each received encryption key in the cloud 220 at a time specific to each received encryption key.

In one embodiment, for each received encryption key, the processor at the gateway server 210 validates each received encryption key for use by the processor at the gateway server 210 to encrypt data to be stored in the cloud 220, wherein validating each received encryption key comprises the storing in the cloud of each received encryption key in step 35.

In all these embodiments, encryption and/or decryption is done by the system without intervention of the user so that the user can interact with his contents in the cloud transparently through the portal.

In the embodiments described, it was assumed that when a key was validated, the key was used for protecting all the contents of all the users inside the customer premises or network. However, further level of granularity may be needed. For example, it may be possible to associate a different key with a certain types of contents to be stored or archived on the cloud. A key may be used for storing or archiving mails and a different key for storing word documents etc. Other more complex level granularity can be envisioned. For example a key may be validated per user or per group of users etc.

Various forms of encryption may be used for protecting a user contents including asymmetric cryptography such as public key cryptography whereby a first key is used to encrypt and a second key different from the first key is used to decrypt.

Although encryption has been illustrated as an example in various embodiments, it will be understood that, the key generated and validated for protecting users contents can be a password or a key for signing contents or any other form of credentials.

The present invention provides a computer program product for managing a key, the computer program product comprising a computer-readable storage medium having computer-readable program code embodied therewith, the computer-readable program code configured to control a data processing apparatus to carry out instructions to execute the embodiments of the above-described method of the invention.

The present invention provides a computer program comprising code instructions for implementing the method of the invention.

The present invention provides a method or system substantially as hereinbefore described with reference to the accompanying drawings.

The present invention provides a system, method, computer program product or computer program. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium.

A computer readable storage medium or device may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible hardware storage medium or device that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A computer program product of the present invention comprises a computer readable hardware storage medium or device having computer readable program code stored therein, said program code containing instructions which, upon being executed by a processor of a computer system (e.g., a computer system of the gateway server 210), implement the methods of the present invention.

A computer system of the present invention (e.g., a computer system of the gateway server 210) comprises a processor, a memory coupled to the processor, and a computer readable storage device coupled to the processor, said storage device containing program code which, upon being executed by the processor, implements the methods of the present invention.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for managing data security in a computing environment, said method comprising:

receiving, by a processor of a gateway server from a user device, at least one message, wherein each message requests that an encryption key be downloaded to the user device, and wherein the gateway server interfaces between the user device and a cloud comprising a plurality of interconnected computing systems external to the user device;

in response to the received at least one message: said processor generating, for each message, at least one unique encryption key for encrypting and decrypting data, sending each encryption key of the at least one generated encryption key to the user device, and not storing any of the generated encryption keys in the cloud, wherein the at least one generated encryption key comprises a first encryption key;

for each encryption key of the at least one generated encryption key having been sent to the user device, said processor receiving each sent encryption key of the at least one generated encryption key returned from the user device;

for each received encryption key, said processor validating each received encryption key for use by the processor to encrypt data to be stored in the cloud, wherein said validating each received encryption key comprises storing each received encryption key in the cloud at a time specific to each received encryption key, wherein said storing each received encryption key in the cloud comprises storing the first encryption key in the cloud at a first key storage time;

said processor storing first data in the cloud at a first data storage time after the first key storage time;

said processor encrypting the first data, at a first data encryption time after the first data storage time, by using the first encryption key to encrypt the first data; and said processor decrypting the encrypted first data, at a first data decryption time after the first data encryption time, by using the first encryption key to decrypt the encrypted first data.

2. The method of claim 1, wherein said receiving each encryption key returned from the user device comprises receiving a second encryption key returned from the user device, wherein said storing comprises storing the second encryption key in the cloud at a second key storage time after the first data storage time, wherein the encrypted first data is denoted as singly encrypted first data, and wherein the method further comprises:

said processor encrypting the singly encrypted first data, at another first data encryption time after the second key storage time, by using the second encryption key to encrypt the singly encrypted first data to form a doubly encrypted first data; and said processor decrypting the doubly encrypted first data, by using the second encryption key to decrypt the doubly encrypted first data to form the singly encrypted first data, followed by using the first encryption key to decrypt the singly encrypted first data to form the first data unencrypted.

3. The method of claim 1, wherein said receiving each encryption key returned from the user device comprises receiving a second encryption key returned from the user device, wherein said storing comprises storing the second encryption key in the cloud at a second key storage time after the first data storage time, and wherein the method further comprises:

said processor abandoning the first encryption key at a first key abandoning time after the first data decryption time; and said processor encrypting the first data, at another first data encryption time after the first data abandoning time and after the second key storage time, by using the second encryption key to encrypt the first data.

4. The method of claim 3, wherein the first data decryption time is simultaneous with the second key storage time.

5. The method of claim 3, wherein the method further comprises:

said processor storing second data in the cloud at a second data storage time prior to the second key storage time;

said processor encrypting the second data, at a second data encryption time after the second data storage time, by using the second encryption key to encrypt the second data; and said processor decrypting the encrypted second data, at a second data decryption time after the second data encryption time, by using the second encryption key to decrypt the encrypted second data.

6. A computer program product, comprising a computer readable storage device having computer readable program code stored therein, said program code containing instructions which, upon being executed by a processor of a gateway server of a computer system implements a method for managing data security in a computing environment, said method comprising:

receiving, by the processor of the gateway server from a user device, at least one message, wherein each message requests that an encryption key be downloaded to the user device, and wherein the gateway server interfaces between the user device and a cloud comprising a plurality of interconnected computing systems external to the user device;

in response to the received at least one message: said processor generating, for each message, at least one unique encryption key for encrypting and decrypting data, sending each encryption key of the at least one generated encryption key to the user device, and not storing any of the generated encryption keys in the cloud, wherein the at least one generated encryption key comprises a first encryption key;

for each encryption key of the at least one generated encryption key having been sent to the user device, said processor receiving each sent encryption key of the at least one generated encryption key returned from the user device;

for each received encryption key, said processor validating each received encryption key for use by the processor to encrypt data to be stored in the cloud, wherein said validating each received encryption key comprises storing each received encryption key in the cloud at a time specific to each received encryption key, wherein said storing each received encryption key in the cloud comprises storing the first encryption key in the cloud at a first key storage time;

said processor storing first data in the cloud at a first data storage time after the first key storage time;

said processor encrypting the first data, at a first data encryption time after the first data storage time, by using the first encryption key to encrypt the first data; and said processor decrypting the encrypted first data, at a first data decryption time after the first data encryption time, by using the first encryption key to decrypt the encrypted first data.

7. The computer program product of claim 6, wherein said receiving each encryption key returned from the user device comprises receiving a second encryption key returned from the user device, wherein said storing comprises storing the second encryption key in the cloud at a second key storage time after the first data storage time, wherein the encrypted first data is denoted as singly encrypted first data, and wherein the method further comprises:

said processor encrypting the singly encrypted first data, at another first data encryption time after the second key storage time, by using the second encryption key to encrypt the singly encrypted first data to form a doubly encrypted first data; and said processor decrypting the doubly encrypted first data, by using the second encryption key to decrypt the doubly encrypted first data to form the singly encrypted first data, followed by using the first encryption key to decrypt the singly encrypted first data to form the first data unencrypted.

8. The computer program product of claim 6, wherein said receiving each encryption key returned from the user device comprises receiving a second encryption key returned from the user device, wherein said storing comprises storing the second encryption key in the cloud at a second key storage time after the first data storage time, and wherein the method further comprises:

said processor abandoning the first encryption key at a first key abandoning time after the first data decryption time; and said processor encrypting the first data, at another first data encryption time after the first data abandoning time and after the second key storage time, by using the second encryption key to encrypt the first data.

9. The computer program product of claim 8, wherein the first data decryption time is simultaneous with the second key storage time.

10. The computer program product of claim 8, wherein the method further comprises:

said processor storing second data in the cloud at a second data storage time prior to the second key storage time;

said processor encrypting the second data, at a second data encryption time after the second data storage time, by using the second encryption key to encrypt the second data; and said processor decrypting the encrypted second data, at a second data decryption time after the second data encryption time, by using the second encryption key to decrypt the encrypted second data.

11. A computer system comprising a gateway server that includes a processor, a memory coupled to the processor, and a computer readable storage device coupled to the processor, said storage device containing program code which, upon being executed by the processor, implements a method for managing data security in a computing environment, said method comprising:

receiving, by the processor of the gateway server from a user device, at least one message, wherein each message requests that an encryption key for encrypting and decrypting data be downloaded to the user device, and wherein the gateway server interfaces between the user device and a cloud comprising a plurality of interconnected computing systems external to the user device;

in response to the received at least one message: said processor generating, for each message, at least one unique encryption key for encrypting and decrypting data, sending each encryption key of the at least one generated encryption key to the user device, and not storing any of the generated encryption keys in the cloud, wherein the at least one generated encryption key comprises a first encryption key;

for each encryption key of the at least one generated encryption key having been sent to the user device, said processor receiving each sent encryption key of the at least one generated encryption key returned from the user device;

for each received encryption key, said processor validating each received encryption key for use by the processor to encrypt data to be stored in the cloud, wherein said validating each received encryption key comprises storing each received encryption key in the cloud at a time specific to each received encryption key, wherein said storing each received encryption key in the cloud comprises storing the first encryption key in the cloud at a first key storage time;

said processor storing first data in the cloud at a first data storage time after the first key storage time;

said processor encrypting the first data, at a first data encryption time after the first data storage time, by using the first encryption key to encrypt the first data; and said processor decrypting the encrypted first data, at a first data decryption time after the first data encryption time, by using the first encryption key to decrypt the encrypted first data.

12. The computer system of claim 11, wherein said receiving each encryption key returned from the user device comprises receiving a second encryption key returned from the user device, wherein said storing comprises storing the second encryption key in the cloud at a second key storage time after the first data storage time, wherein the encrypted first data is denoted as singly encrypted first data, and wherein the method further comprises:

said processor encrypting the singly encrypted first data, at another first data encryption time after the second key storage time, by using the second encryption key to encrypt the singly encrypted first data to form a doubly encrypted first data; and said processor decrypting the doubly encrypted first data, by using the second encryption key to decrypt the doubly encrypted first data to form the singly encrypted first data, followed by using the first encryption key to decrypt the singly encrypted first data to form the first data unencrypted.

13. The computer system of claim 11, wherein said receiving each encryption key returned from the user device comprises receiving a second encryption key returned from the user device, wherein said storing comprises storing the second encryption key in the cloud at a second key storage time after the first data storage time, and wherein the method further comprises:

said processor abandoning the first encryption key at a first key abandoning time after the first data decryption time; and said processor encrypting the first data, at another first data encryption time after the first data abandoning time and after the second key storage time, by using the second encryption key to encrypt the first data.

14. The computer system of claim 13, wherein the first data decryption time is simultaneous with the second key storage time.

15. The computer system of claim 13, wherein the method further comprises:

said processor storing second data in the cloud at a second data storage time prior to the second key storage time;

said processor encrypting the second data, at a second data encryption time after the second data storage time, by using the second encryption key to encrypt the second data; and said processor decrypting the encrypted second data, at a second data decryption time after the second data encryption time, by using the second encryption key to decrypt the encrypted second data.

* * * * *